United States Patent
Zhang et al.

(10) Patent No.: US 9,935,759 B2
(45) Date of Patent: Apr. 3, 2018

(54) SMALL CELL CONFIGURATION FOR INTERFERENCE MITIGATION

(71) Applicant: Nokia Technologies Oy, Espoo (FI)

(72) Inventors: Yuantao Zhang, Beijing (CN); Haipeng Lei, Beijing (CN); Kodo Shu, Shanghai (CN); Cássio Ribeiro, Espoo (FI); Xiaolong Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 130 days.

(21) Appl. No.: 14/896,080

(22) PCT Filed: Jun. 28, 2013

(86) PCT No.: PCT/CN2013/078409
§ 371 (c)(1),
(2) Date: Dec. 4, 2015

(87) PCT Pub. No.: WO2014/205796
PCT Pub. Date: Dec. 31, 2014

(65) Prior Publication Data
US 2016/0134413 A1    May 12, 2016

(51) Int. Cl.
*H04J 3/00* (2006.01)
*H04L 5/14* (2006.01)
*H04L 1/18* (2006.01)
*H04B 7/26* (2006.01)
(Continued)

(52) U.S. Cl.
CPC ............. *H04L 5/14* (2013.01); *H04B 7/2621* (2013.01); *H04B 7/2656* (2013.01); *H04L 1/1854* (2013.01); *H04L 5/0055* (2013.01); *H04W 72/042* (2013.01)

(58) Field of Classification Search
CPC ....... H04L 5/14; H04L 1/1854; H04B 7/2621; H04B 7/2656
See application file for complete search history.

(56) References Cited

U.S. PATENT DOCUMENTS

| | | | |
|---|---|---|---|
| 2011/0032855 A1* | 2/2011 | Kim ...................... | H04L 5/0037 370/294 |
| 2011/0077038 A1* | 3/2011 | Montojo ................ | H04B 7/024 455/507 |

(Continued)

FOREIGN PATENT DOCUMENTS

| | | |
|---|---|---|
| CN | 101753198 | 6/2010 |
| CN | 101983484 | 3/2011 |

(Continued)

OTHER PUBLICATIONS

U.S. Appl. No. 61/600,998 Provisional Specification.*
(Continued)

*Primary Examiner* — Siren Wei
(74) *Attorney, Agent, or Firm* — Harrington & Smith

(57) ABSTRACT

Configuration of various radio systems may have a number of possible benefits. For example, small cell configuration may be useful for interference mitigation. A method, in certain embodiments, can include determining a virtual subframe index for a cell. The method can also include communicating the virtual subframe index for the cell by communicating a time division duplex configuration and a relative subframe offset.

13 Claims, 5 Drawing Sheets

(51) Int. Cl.
*H04L 5/00* (2006.01)
*H04W 72/04* (2009.01)

(56) References Cited

U.S. PATENT DOCUMENTS

| | | | | |
|---|---|---|---|---|
| 2012/0275355 | A1* | 11/2012 | Park | H04L 1/1893 370/281 |
| 2013/0077543 | A1 | 3/2013 | Kim et al. | |
| 2013/0337821 | A1* | 12/2013 | Clegg | H04L 5/0062 455/452.1 |
| 2014/0119246 | A1* | 5/2014 | Yin | H04W 72/12 370/280 |
| 2015/0023275 | A1* | 1/2015 | Kim | H04L 5/0035 370/329 |

FOREIGN PATENT DOCUMENTS

| | | |
|---|---|---|
| EP | 2077641 A2 | 7/2009 |
| WO | 2002/023793 A2 | 3/2002 |
| WO | 2009131396 | 10/2009 |
| WO | 2011082532 | 7/2011 |
| WO | 2012/121477 A1 | 9/2012 |

OTHER PUBLICATIONS

International Search Report and Written Opinion received for corresponding Patent Cooperation Treaty Application No. PCT/CN2013/078409, dated Apr. 3, 2014, 13 pages.

"Analysis and Design Considerations of Cell on/off in Small Cell", 3GPP TSG-RAN Working Group 1 meeting #73, R1-132236, Agenda: 6.2.5.1.2, LG Electronics, May 20-24, 2013, 6 pages.

"3rd Generation Partnership Project; Technical Specification Group Radio Access Network; Evolved Universal Terrestrial Radio Access (E-UTRA); Physical Channels and Modulation (Release 11)", 3GPP TS 36.211, V11.1.0, Dec. 2012, pp. 1-108.

Extended European Search Report received for corresponding European Patent Application No. 13888497.8, dated Feb. 10, 2017, 6 pages.

* cited by examiner

US 9,935,759 B2

SMALL CELL CONFIGURATION FOR INTERFERENCE MITIGATION

RELATED APPLICATION

This application was originally filed as PCT Application No. PCT/CN2013/078409 filed Jun. 28, 2013.

BACKGROUND

Field

Configuration of various radio systems may have a number of possible benefits. For example, small cell configuration may be useful for interference mitigation.

Description of the Related Art

Small cell deployment scenarios in long term evolution (LTE) release 12 (Rel.12) may include a dense small cell scenario and a sparse small cell scenario. In a dense scenario, large inter-cell interference may be generated. One scheme to avoid such interference may be through subframe level small cell on/off. In subframe level small cell on/off, in some particular subframes the small cell could just turn off its transmission. Thus, no signal is transmitted in such subframe, thereby mitigating interference to neighbor cells.

User packet throughput (UPT) benefits may be observable, relative to a baseline without cell-specific reference signal (CRS) interference mitigation or multicast-broadcast single frequency network (MBSFN) subframes with file transfer protocol (FTP) models 1 and 3, at least when subframe level small cell on/off is assumed.

SUMMARY

According to certain embodiments, a method can include determining a virtual subframe index for a cell. The method can also include communicating the virtual subframe index for the cell by communicating a time division duplex configuration and a relative subframe offset.

In certain embodiments, a method can include receiving a time division duplex configuration and a relative subframe offset. The method can also include determining a virtual subframe index for a cell based on the time division duplex configuration and the relative subframe offset.

An apparatus, according to certain embodiments, can include at least one processor and at least one memory including computer program code. The at least one memory and the computer program code can be configured to, with the at least one processor, cause the apparatus at least to determine a virtual subframe index for a cell. The at least one memory and the computer program code can also be configured to, with the at least one processor, cause the apparatus at least to communicate the virtual subframe index for the cell by communicating a time division duplex configuration and a relative subframe offset.

An apparatus, in certain embodiments, can include at least one processor and at least one memory including computer program code. The at least one memory and the computer program code can be configured to, with the at least one processor, cause the apparatus at least to receive a time division duplex configuration and a relative subframe offset. The at least one memory and the computer program code can also be configured to, with the at least one processor, cause the apparatus at least to determine a virtual subframe index for a cell based on the time division duplex configuration and the relative subframe offset.

According to certain embodiments, an apparatus can include means for determining a virtual subframe index for a cell. The apparatus can also include means for communicating the virtual subframe index for the cell by communicating a time division duplex configuration and a relative subframe offset.

In certain embodiments, an apparatus can include means for receiving a time division duplex configuration and a relative subframe offset. The apparatus can also include means for determining a virtual subframe index for a cell based on the time division duplex configuration and the relative subframe offset.

A computer-readable medium can be, in certain embodiments, encoded with instructions that, when executed in hardware perform a process. The process can include determining a virtual subframe index for a cell. The process can also include communicating the virtual subframe index for the cell by communicating a time division duplex configuration and a relative subframe offset.

According to certain embodiments, a computer-readable medium can be encoded with instructions that, when executed in hardware perform a process. The process can include receiving a time division duplex configuration and a relative subframe offset. The process can also include determining a virtual subframe index for a cell based on the time division duplex configuration and the relative subframe offset.

In certain embodiments, a computer-program product can encode instructions for performing a process. The process can include determining a virtual subframe index for a cell. The process can also include communicating the virtual subframe index for the cell by communicating a time division duplex configuration and a relative subframe offset.

A computer-program product, according to certain embodiments, can encode instructions for performing a process. The process can include receiving a time division duplex configuration and a relative subframe offset. The process can also include determining a virtual subframe index for a cell based on the time division duplex configuration and the relative subframe offset.

A system according to certain embodiments can include a first apparatus and a second apparatus. The first apparatus can include means for determining a virtual subframe index for a cell. The first apparatus can also include means for communicating the virtual subframe index for the cell by communicating a time division duplex configuration and a relative subframe offset. The second apparatus can include means for receiving the time division duplex configuration and the relative subframe offset. The second apparatus can also include means for determining the virtual subframe index for the cell based on the time division duplex configuration and the relative subframe offset.

BRIEF DESCRIPTION OF THE DRAWINGS

For proper understanding of the invention, reference should be made to the accompanying drawings, wherein.

DETAILED DESCRIPTION

Challenges of using subframe level small cell on/off can include deciding how the macro cell indicates to the small cell with the subframe on/off pattern and correspondingly deciding how the small cell indicates to the user equipment (UE) the configured pattern. Another challenge may be deciding how to send the acknowledgement/negative acknowledgment (ACK/NACK or A/N) for physical uplink shared channel (PUSCH) transmissions when the corresponding downlink (DL) subframe is turned off. A further challenge may be deciding how and when to send an uplink (UL) grant for a specific PUSCH transmission when the corresponding DL subframe is turned off.

According to certain embodiments, a frequency division duplex (FDD) small cell can be indicated by a macro cell, or a network node, through an X2 interface, with a time division duplex (TDD) configuration and a relative subframe offset. A system subframe index (SSI) can be a subframe index defined in the FDD mode. Various TDD configurations are described, for example, in chapter 4.2 of 3GPP TS 36.211 V11.1.0 (2012-12), "3rd Generation Partnership Project; Technical Specification Group Radio Access Network; Evolved Universal Terrestrial Radio Access (E-UTRA); Physical Channels and Modulation (Release 11)," the entirety of which is hereby incorporated herein by reference. Other TDD configurations are also permitted. In one example, the TDD configuration may be "DSUUDDSUUD." By using such information, the small cell may deduce a virtual subframe index (VSI) for each DL/UL subframe. The function may be VSI=f(SSI, offset) =mod (SSI+(10−offset), 10).

Figure 1:
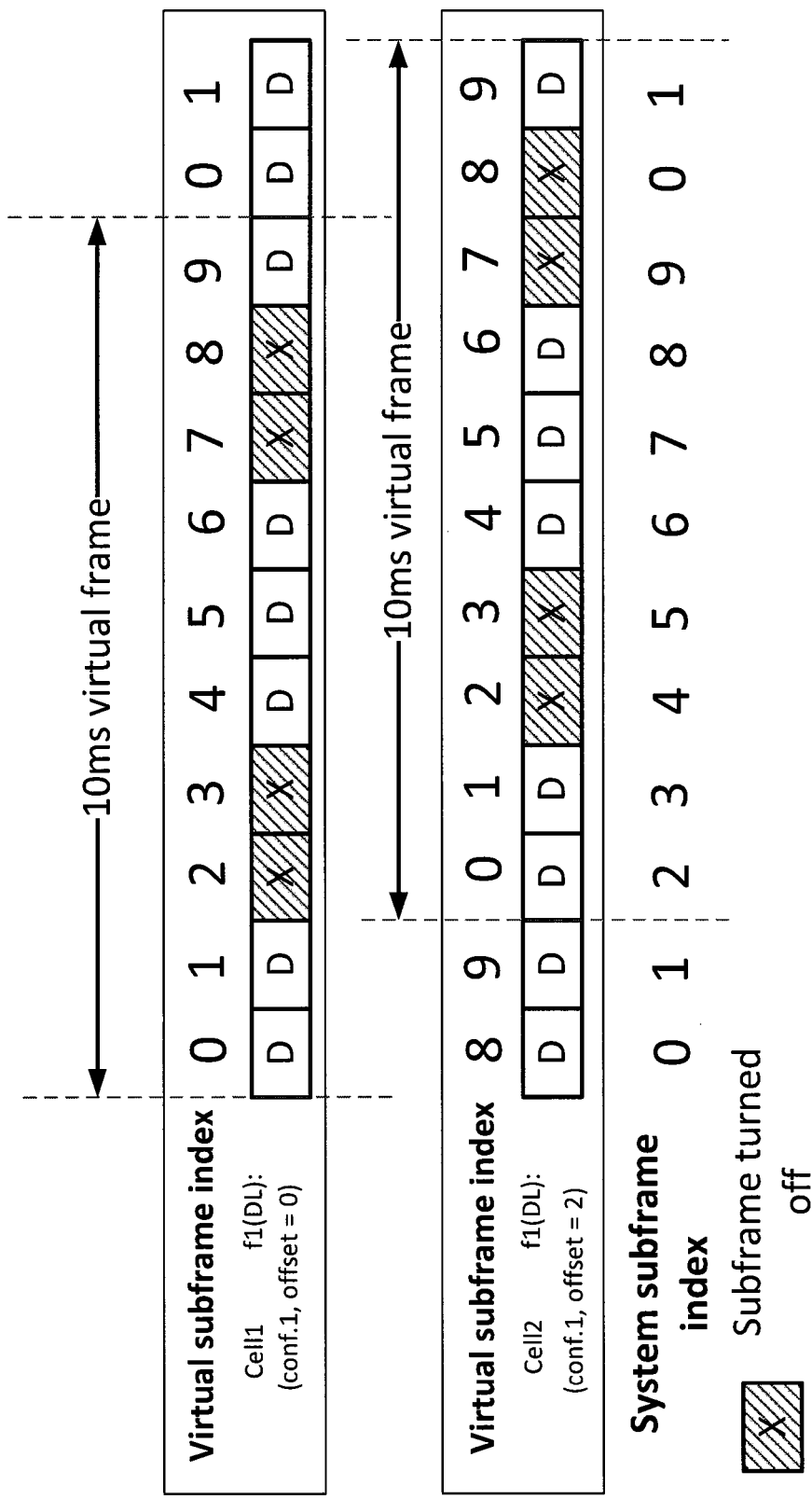
FIG. 1 illustrates subframe on/off configuration according to certain embodiments.

FIG. 1 illustrates subframe on/off configuration according to certain embodiments. More specifically, FIG. 1 shows an example where cell 1 is indicated as TDD configuration 1 and offset=0, while cell 2 is indicated as TDD configuration 1 and offset=2. Subframes marked with "X" correspond to an UL subframe, according to the virtual subframe index, within the TDD configuration. Thus, these subframes may be turned off by the small cell.

The TDD configuration can be transmitted in a physical downlink control channel (PDCCH) in the subframe with the virtual subframe index preknown by the UE. The preknown information may be informed to the UE using radio resource control (RRC) signaling. Alternatively, the user equipment could be configured by default to expect the TDD configuration in a specific subframe, for example virtual subframe 0. Other ways of configuring the preknown information are also permitted.

With such a configuration, the related transmission timing can follow various rules. For example, the PUSCH A/N for the UL subframe corresponding to "X" (namely an eNB-off time) at DL can follow the timing defined for the configured TDD configuration. The PUSCH A/N for the UL subframe (SF) corresponding to DL transmission (namely an eNB-on time marked as "D" in FIG. 1) subframe can follow the timing defined for the FDD configuration, such as 4 SFs delay.

Additionally, the UL grant scheduling timing for the UL subframe corresponding to "X" (namely an eNB-off time) at DL can follow the configured TDD configuration. The UL-grant scheduling timing for the UL subframe corresponding to "D" (namely an eNB-on time) can follow the FDD configuration.

One additional new bit can be included in the UL-grant downlink control information (DCI) to differentiate whether this DCI schedules the PUSCH transmission in the following UL SF following FDD timing or TDD timing.

As described above, an FDD small cell could be configured with a TDD configuration, and a relative subframe offset, by which the small cell will deduce a virtual subframe index for each DL/UL subframe. The function for such derivation can be VSI=f(SSI, offset)=mod (SSI+(10-offset), 10), as also mentioned above.

Figure 2:
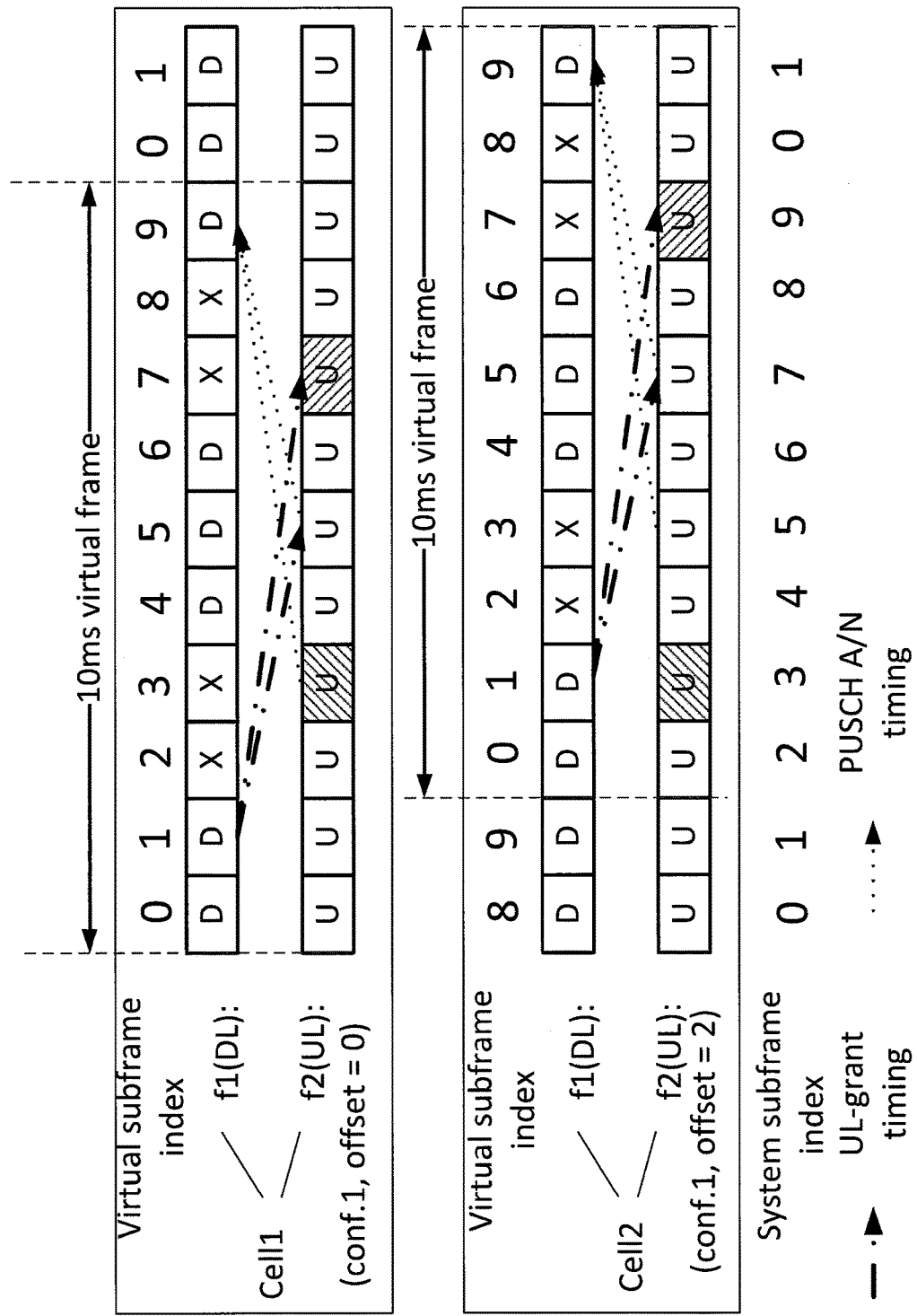
FIG. 2 illustrates subframe on/off configuration and related timing according to certain embodiments.

FIG. 2 illustrates subframe on/off configuration and related timing according to certain embodiments. Moreover specifically, FIG. 2 shows an example in which cell 1 is indicated as configuration 1 and offset=0, while cell 2 is indicated as configuration 1 and offset=2. Therefore the virtual subframe index is equal to the system subframe index for cell 1, while there is a 2 SF bias for cell 2. The DL subframes which correspond to the UL subframes in the configured TDD configuration, according to their virtual subframe index, can be turned off by the small cell.

The TDD configuration can be transmitted in PDCCH in the subframe with the virtual subframe index preknown by the UE, for example, in the virtual subframe index 0.

With such configuration, the related transmission timing can follow various rules. For example, the UL-grant timing for the UL subframe overlapped with "X" can follow the configured TDD configuration. The UL-grant timing for the UL subframe overlapped with "D" can follow the FDD configuration. For example, in FIG. 2 for cell 1 the UL-grant for SF5 and SF7 can both be transmitted in SF1. The UL-grant timing for SF5 and for SF7, however, can follow the FDD and the configured TDD UL-grant timing rule, respectively.

The PUSCH A/N for the UL subframe overlapped with "X" can follow the timing defined for the configured TDD configuration. The PUSCH A/N for the UL SF overlapped with DL subframe can follow the timing defined for the FDD configuration. For example, in FIG. 2 the A/N for SF3 and SF5 can all be transmitted in SF9. The A/N timing for SF3 and SF5, however, can follow the FDD and the configured TDD A/N timing rule, respectively.

When the UL grant for a particular UL SF happens to be in the "X" subframe or when the A/N for a particular UL SF happens to be in the "X" subframe, the UL can just transmit to the channel without depending on scheduling, like physical uplink control channel (PUCCH), sounding reference signal (SRS), or the like, or even semi-persistent scheduling (SPS) data. Another alternative is to modify the UL grant or the A/N to the nearest SF, and then the UL SF could be a normal subframe.

As shown in FIG. 2, if cell 1 will schedule PUSCH in both UL SF5 and SF7 for a specific UE, the respective UL grant DCIs may all be transmitted in DL SF1. One additional new bit can be included in the UL grant DCI to differentiate whether this DCI schedules the PUSCH transmission in the following UL SF following FDD timing or TDD timing. For example, if bit "0" is defined as corresponding to the case of using FDD timing and bit "1" is defined as corresponding to the case of using TDD timing, then this bit in the DCI of scheduling PUSCH in SF5 can be "0", and it can be "1" in DCI scheduling PUSCH in SF7.

Figure 3:
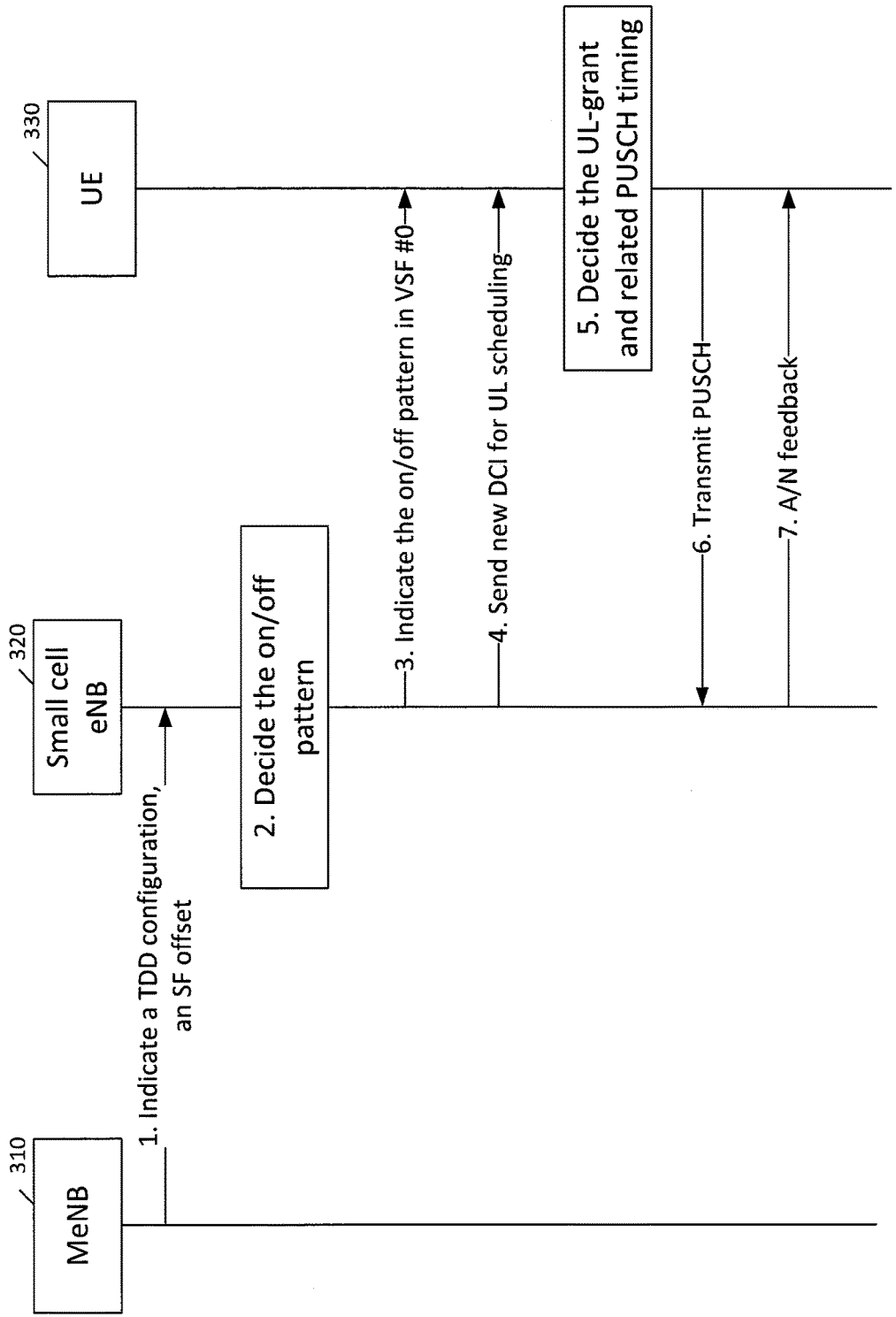
FIG. 3 illustrates exchanged signaling among macro cell, small cell, and user equipment, according to certain embodiments.

FIG. 3 illustrates exchanged signaling among macro cell, small cell, and user equipment, according to certain embodiments. FIG. 3 shows the flow chart of the signaling exchanged among macro cell, small cell, and UE. As shown in FIG. 3, at 1 macro cell 310 can indicate to the small cell 320 a TDD configuration and an SF offset, by which the small cell 320 can decide the on/off pattern at 2. Then, at 3, the small cell 320 can indicate to the UE 330 this on/off pattern (for example, the TDD configuration) in VSF #0. If UL data needs to be transmitted, the small cell 320 can, at 4, schedule the UL data transmission by the new defined DCI. The UE 330 could know the PUSCH timing after correctly decoding this DCI at 5. For example, the UE 330 could know in which UL SF the UE 330 is to send the data packet. Finally, after small cell 320 has received the PUSCH at 6, the small cell 320 can, at 7, transmit A/N to the UE 330 according to the above defined timing rule.

Figure 4:
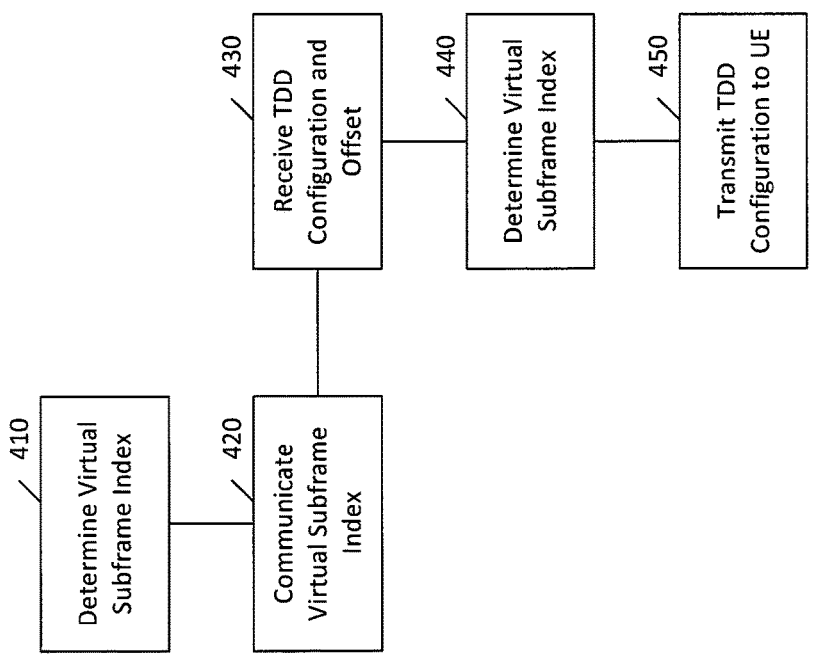
FIG. 4 illustrates a method according to certain embodiments.

FIG. 4 illustrates a method according to certain embodiments. As shown in FIG. 4, a method can include, at 410, determining a virtual subframe index for a cell. The method can also include, at 420, communicating the virtual subframe index for the cell by communicating a time division duplex configuration and a relative subframe offset.

The cell can be a frequency division duplex small cell. For example, the cell can be the cell controlled by small cell eNB 320 in FIG. 3. The determining and the communicating can be performed by a base station of a macro cell that includes the cell, such as MeNB 310 in FIG. 3. The communicating can involve communicating over an X2 interface. Moreover, the virtual subframe index can be defined by VSI=f(SSI, offset)=mod (SSI+(10−offset), 10), where VSI is virtual subframe index and SSI is system subframe index.

In FIG. 4, the method can additionally include, at 430, receiving the time division duplex configuration and the relative subframe offset. The method can also include, at 440, determining a virtual subframe index for a cell based on the time division duplex configuration and the relative subframe offset. The cell comprises can be a frequency division duplex small cell, as mentioned above.

The receiving and the determining can be performed by a base station of the cell, such as small cell eNB 320 in FIG. 3. The virtual subframe index can be defined by VSI=f(SSI, offset)=mod (SSI+(10−offset), 10), where VSI is virtual subframe index and SSI is system subframe index, as mentioned above.

The method can also include, at 450, transmitting, to a user equipment, a time division duplex configuration in a physical downlink control channel in a subframe with a virtual subframe index preknown to the user equipment. This preknown subframe index may, for example, be virtual subframe index 0.

Figure 5:
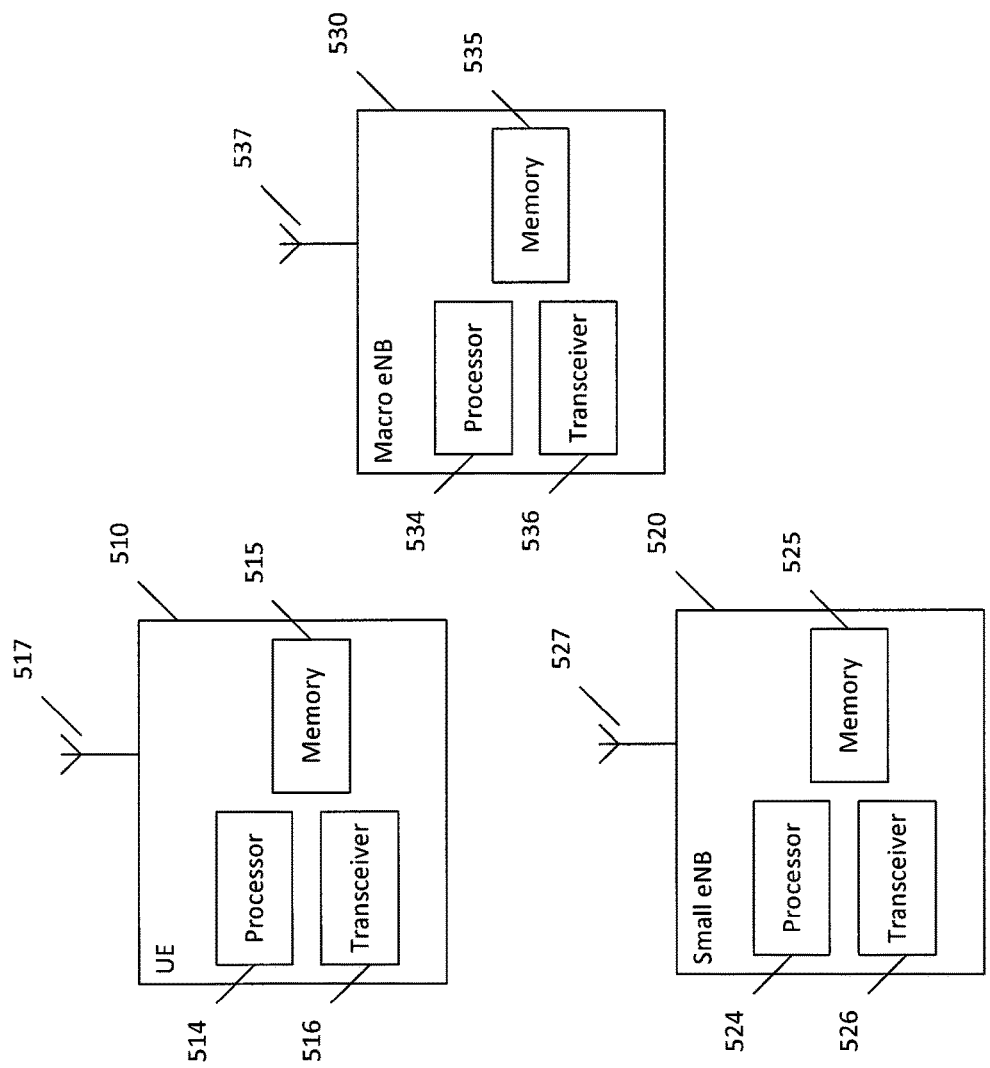
FIG. 5 illustrates a system according to certain embodiments.

FIG. 5 illustrates a system according to certain embodiments of the invention. In one embodiment, a system may include multiple devices, such as, for example, at least one UE 510, at least one small eNB 520 or other base station or access point, and at least one macro eNB 530 or other base station or access point.

Each of these devices may include at least one processor, respectively indicated as 514, 524, and 534. At least one memory can be provided in each device, and indicated as 515, 525, and 535, respectively. The memory may include computer program instructions or computer code contained therein. The processors 514, 524, and 534 and memories 515, 525, and 535 can be configured to provide means corresponding to the various blocks of FIG. 4.

As shown in FIG. 5, transceivers 516, 526, and 536 can be provided, and each device may also include an antenna, respectively illustrated as 517, 527, and 537. Other configurations of these devices, for example, may be provided. For example, macro eNB 530 may be configured for wired communication, in addition to wireless communication, and in such a case antenna 537 would illustrate any form of communication hardware, without being limited to a conventional antenna.

Transceivers 516, 526, and 536 can each, independently, be a transmitter, a receiver, or both a transmitter and a receiver, or a unit or device that is configured both for transmission and reception. Transceivers 516, 526, and 536 can also be configured to include or function as a network interface card.

Processors 514, 524, and 534 can be embodied by any computational or data processing device, such as a central processing unit (CPU), application specific integrated circuit (ASIC), or comparable device. The processors can be implemented as a single controller, or a plurality of controllers or processors.

Memories 515, 525, and 535 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 510, small eNB 520, and macro eNB 530, to perform any of the processes described above (see, for example, FIGS. 1-4). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 5 illustrates a system including a UE, small eNB, and macro eNB, embodiments of the invention may be applicable to other configurations, and configurations involving additional elements.

Various advantages or benefits may arise from certain embodiments. For example, with seven available time division duplex configurations, certain embodiments could achieve flexible configuration on the subframe on/off.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Glossary

A/N ACK/NACK
CRS Cell-specific Reference Signal
DCI Downlink Control Information
DL Downlink
FDD Frequency Division Duplex LTE Long Term Evolution
MBSFN Multicast-Broadcast Single Frequency Network
PDCCH Physical Downlink Control Channel
PUCCH Physical Uplink Control Channel
PUSCH Physical Uplink Shared Channel
RRC Radio Resource Control
SF Subframe
SPS Semi-Persistent Scheduling
SRS Sounding Reference Signal
SSI System Subframe Index
TDD Time Division Duplex
UE User Equipment
UL Uplink
UPT User Packet Throughput
VSF Virtual Subframe
VSI Virtual Subframe Index

What is claimed is:

1. A method, comprising:
  determining a virtual subframe index for a cell, wherein the cell comprises a frequency division duplex small cell; and
  communicating the virtual subframe index for the cell by communicating a time division duplex configuration and a relative subframe offset, wherein determining the virtual subframe index for the cell is based at least on a system subframe index and the relative subframe offset, and wherein the determining and the communicating are performed by a base station of a macro cell that includes the cell.

2. The method of claim 1, wherein the virtual subframe index is defined by VSI=f(SSI, offset)=mod (SSI+(10−offset), 10), where VSI is virtual subframe index and SSI is system subframe index.

3. The method of claim 1, wherein timing of a physical uplink control channel acknowledgement/negative acknowledgement for an uplink subframe corresponding to a base station off time at downlink follows a configured time division duplex configuration and timing of the physical uplink control channel acknowledgement/negative acknowledgement for an uplink subframe corresponding to a base station on time at downlink follows a frequency division duplex configuration.

4. The method of claim 1, wherein timing of an uplink grant for an uplink subframe corresponding to a base station off time at downlink follows a configured time division duplex configuration and timing of the uplink grant for an uplink subframe corresponding to a base station on time at downlink follows a frequency division duplex configuration.

5. A method, comprising:
  receiving a time division duplex configuration and a relative subframe offset; and
  determining a virtual subframe index for a cell based on the time division duplex configuration, a system subframe index, and the relative subframe offset, wherein the cell comprises a frequency division duplex small cell, and wherein the receiving and the determining are performed by a base station of the cell.

6. The method of claim 5, wherein the virtual subframe index is defined by VSI=f(SSI, offset)=mod (SSI+(10−offset), 10), where VSI is virtual subframe index and SSI is system subframe index.

7. The method of claim 5, further comprising:
  transmitting, to a user equipment, a time division duplex configuration in a physical downlink control channel in a subframe with a virtual subframe index preknown to the user equipment.

8. An apparatus, comprising:
  at least one processor; and
  at least one memory including computer program code,
  wherein the at least one memory and the computer program code are configured to, with the at least one processor, cause the apparatus at least to:
    determine a virtual subframe index for a cell, wherein the cell comprises a frequency division duplex small cell; and
    communicate the virtual subframe index for the cell by communicating a time division duplex configuration and a relative subframe offset, wherein determination of the virtual subframe index for the cell is based at least on a system subframe index and the relative subframe offset, and wherein the apparatus comprises a base station of a macro cell that includes the cell.

9. The apparatus of claim 8, wherein the at least one memory and the computer program code are configured to, with the at least one processor, cause the apparatus at least to communicate the virtual subframe index over an X2 interface.

10. The apparatus of claim 8, wherein the virtual subframe index is defined by VSI=f(SSI, offset)=mod (SSI+(10−offset), 10), where VSI is virtual subframe index and SSI is system subframe index.

11. An apparatus, comprising:
  at least one processor; and
  at least one memory including computer program code,
  wherein the at least one memory and the computer program code are configured to, with the at least one processor, cause the apparatus at least to:
    receive a time division duplex configuration and a relative subframe offset; and
    determine a virtual subframe index for a cell based on the time division duplex configuration, a system subframe index, and the relative subframe offset, wherein the cell comprises a frequency division duplex small cell, and wherein the apparatus comprises a base station of the cell.

12. The apparatus of claim 11, wherein the virtual subframe index is defined by VSI=f(SSI, offset)=mod (SSI+(10−offset), 10), where VSI is virtual subframe index and SSI is system subframe index.

13. The apparatus of claim 11, wherein the at least one memory and the computer program code are configured to, with the at least one processor, cause the apparatus at least to transmit, to a user equipment, a time division duplex configuration in a physical downlink control channel in a subframe with a virtual subframe index preknown to the user equipment.

* * * * *